United States Patent [19] [11] 3,877,140
Topolsek [45] Apr. 15, 1975

[54] METHOD OF MANUFACTURING A FENCE OF THERMOPLASTIC PICKETS WITH EMBEDDED WIRE CONNECTING LINKS

[76] Inventor: Hermann Adolf Josef Topolsek, 3 Horwood Dr., Brampton, Ontario, Canada

[22] Filed: June 30, 1972

[21] Appl. No.: 267,897

[52] U.S. Cl. .............. 29/527.1; 256/19; 264/145; 264/149; 264/151
[51] Int. Cl. ... B23p 25/00; B29c 17/02; B29c 17/14
[58] Field of Search .......... 264/151, 145, 149, 295; 256/19; 52/5, 664, 674; 29/527.2, 530, 527.1

[56] References Cited
UNITED STATES PATENTS

| | | | |
|---|---|---|---|
| 1,954,256 | 4/1934 | Nelson | 256/19 |
| 2,628,823 | 2/1953 | Rhone et al. | 256/19 |
| 2,728,108 | 12/1955 | Schelgil, Jr. | 264/145 |
| 3,452,494 | 7/1969 | Prior | 52/674 |
| 3,509,613 | 5/1970 | Koenig | 264/295 |
| 3,622,418 | 11/1971 | Black | 264/151 |

Primary Examiner—Robert F. White
Assistant Examiner—James B. Lowe

[57] ABSTRACT

An article of manufacture, particularly a fence such as a snow fence, comprises a plurality of pickets or slats with a plurality of connecting links between adjacent ones of the pickets. The fence is formed of an extruded thermoplastic material, and each of the pickets or slats has a crease formed therein, and is set or rigidified with that crease. The fence may be formed by extruding a plastic sheet, punching or cutting a plurality of openings which define the pickets and connecting links, and creasing the thermoplastic material lengthwise of each of the pickets. Alternatively, the material may be extruded with a plurality of wires embedded in its in the direction of the extrusion; and the thermoplastic sheet may then be cut across its width except for the wires, and the cut portion pulled along the wires so that the wires form connecting links between adjacent ones of the cut portions. The pickets are formed by creasing them along their axial length, together with the wires embedded therein.

4 Claims, 10 Drawing Figures

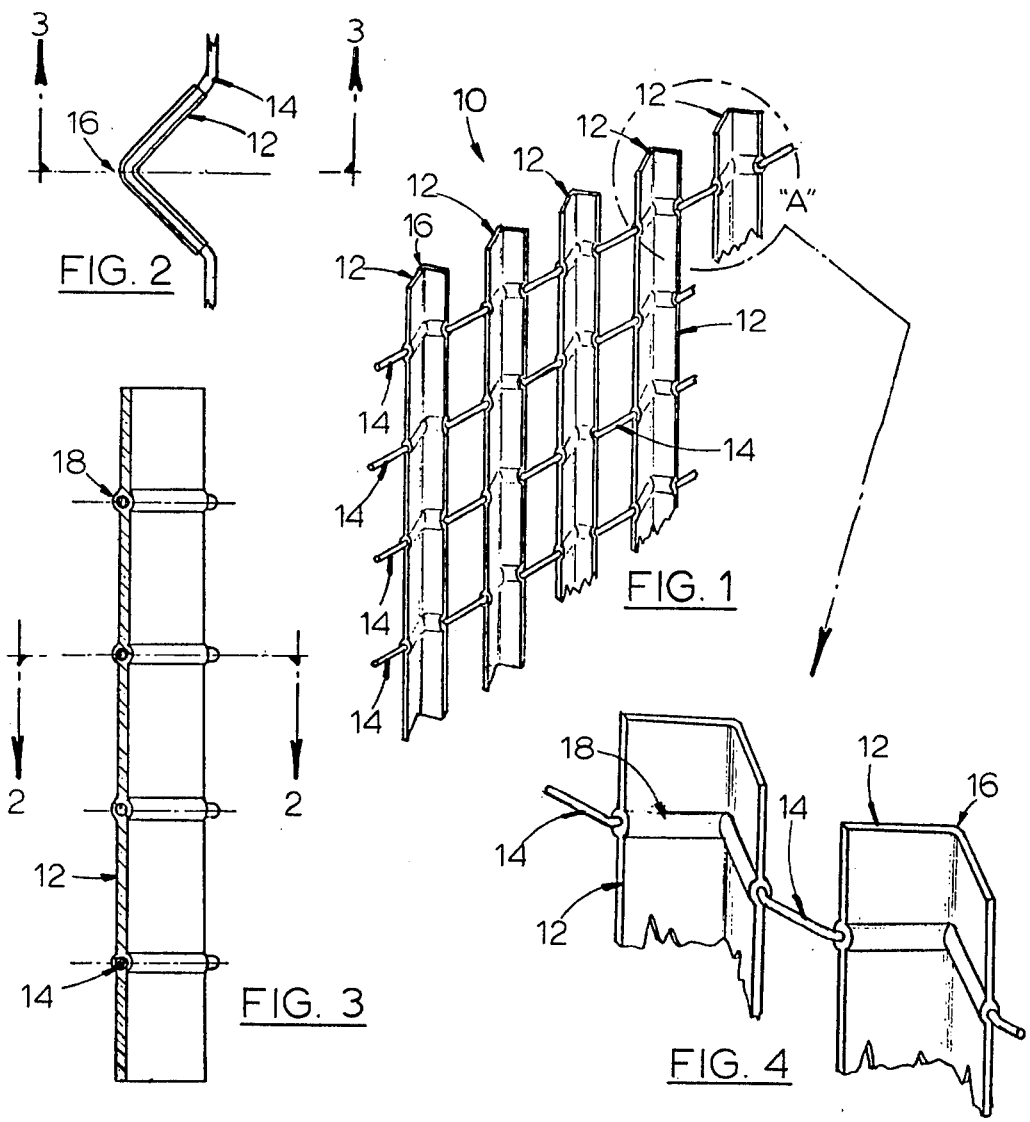

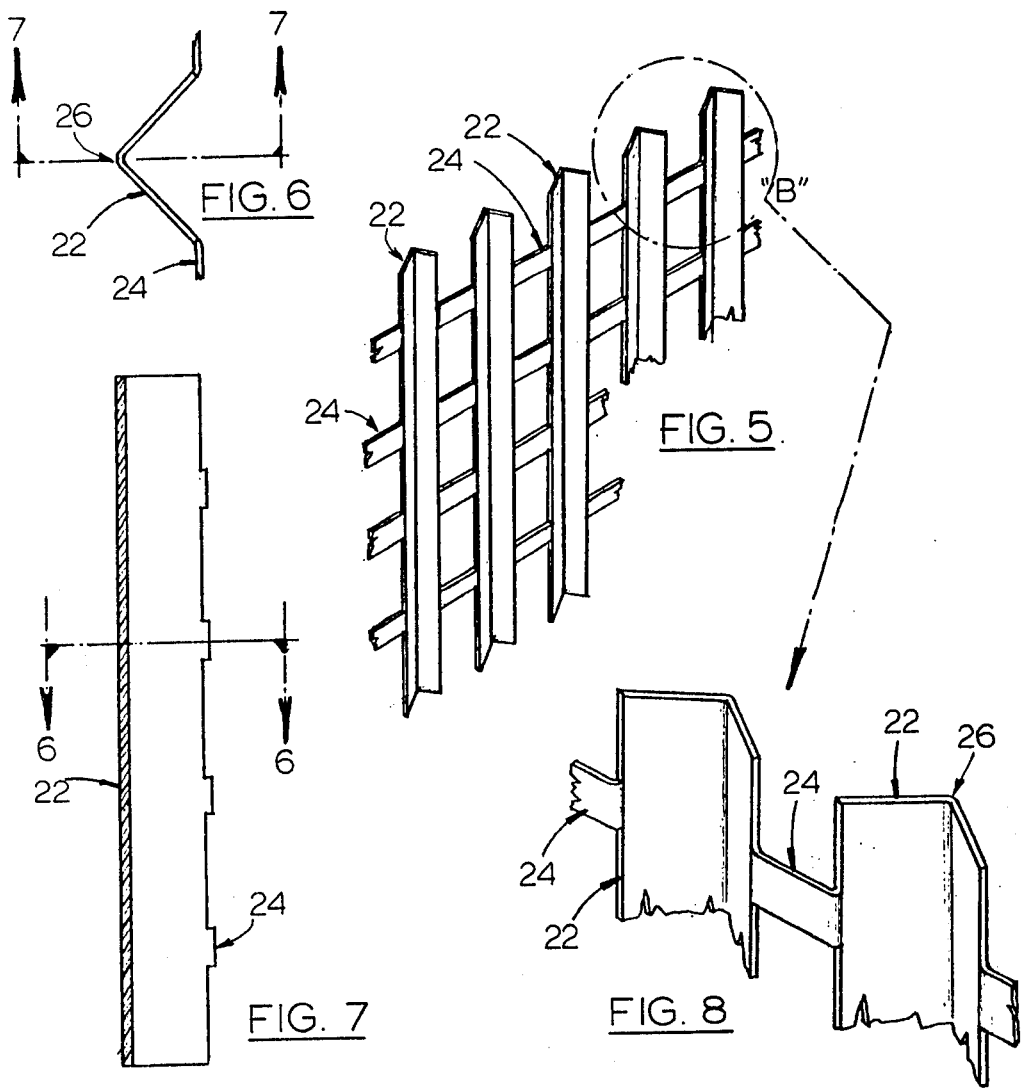

METHOD OF MANUFACTURING A FENCE OF THERMOPLASTIC PICKETS WITH EMBEDDED WIRE CONNECTING LINKS

FIELD OF THE INVENTION

This invention relates to an elongated article which is basically formed from an extruded thermoplastic sheet, and a method of making the same. In particular, the invention relates to an article such as a fence - particularly a snow fence and the like - which is formed from an extruded thermoplastic sheet whose width is essentially the height of any of the pickets of the fence; and wherein each of the pickets is creased along its axial length for rigidity. As noted, the fence is made of extruded thermoplastic sheet which, when rigidified, has the form required including the pickets and connecting links therebetween. The method of manufacture includes the steps of creasing bar-like members or portions of an extruded thermoplastic sheet in predetermined places so as to form the pickets, and permitting the material to set so as to rigidify the thermoplastic material in the desired form.

BACKGROUND OF THE INVENTION

Fences such as snow fences, boundary marker fences, light-weight picket fences for gardens, etc., may very often comprise a plurality of slat or bar-like members which are spaced along the length of the fence, and whose height defines the height of the fence at any given picket. A plurality of connecting links - usualy wire - is arranged along the length of each of the pickets and between adjacent ones so as to secure them one to the other. A snow fence, in particular, is such that when it is erected so that the pickets are vertically or substantially so, they prevent drifting of snow past the erected fence and onto such as highways, driveways, ice rinks, etc. When the snow fences are not required, they are usually rolled lengthwise and stored; and a roll of ordinary snow fence made of woodden pickets secured with wire may be in the order of 100 feet long when unrolled, and may have considerable weight.

As noted, the usual snow fence or other boundary fence of the type, is formed from rough woodden pickets which are secured one to another by a plurality or wires which are wound around each of the pickets and are arranged along the axial length of them. Thus, the wires run essentially lengthwise of the fence and are spaced up its height. Such fences, however, are not ideal in that the wires are subject to fatique and may break during rolling or unrolling operations, the wires are also subject to rust, and the woodden pickets or stakes are usually rough finished and are easily splintered. The fences are therefore unsatisfactory from the point of view of deterioration, and somewhat dangerous to handle because of the possibility of injury to a person who rolls or unrolls such a fence, or erects the same.

This invention, on the other hand, provides a fence or like article of manufacture which is basically formed from an extruded thermoplastic material. Such material may, for example but not to the exclusion of other materials, be such as polyethylene, polypropylene, polyvinylchloride, copolymers of those materials, and others. Such materials are, in any event, not subject to deterioration due to weathering; and, for the most part, are not subject to deterioration due to exposure to ultraviolet light and otherwise. Further, thermoplastic materials of the sort contemplated may be of almost any desired colour.

The invention also provides, therefore, a method of manufacture of a plastic fence or other elongated article of the same sort from an extruded thermoplastic sheet; and the invention provides alternate ways in which the extruded thermoplastic sheet of material may be cut and formed into a useable product. Thus, the invention provides a fence which may be formed entirely of a thermoplastic material, or which may include wires embedded in the pickets and forming the connecting links between them.

SUMMARY OF THE INVENTION

It is an object of this invention to provide a fence which is formed from an extruded sheet of thermoplastic material; where the fence comprises a plurality of bar-like members or pickets, each of which extends substantially for the height of the fence and therefore the width of the extruded sheet material from which the fence is formed, and where each picket has a crease formed and set along the axial length thereof.

A further object of this invention is to provide a method of manufacture of an elongated article such as a fence having a plurality of pickets joined by connecting links secured to the pickets and arranged between adjacent ones thereof; wherein the fence is formed from an extruded thermoplastic material.

Yet a further object of this invention is to provide a fence formed of extruded thermoplastic material wherein wires comprise the connecting links between adjacent ones of the pickets, and wherein the wires are also embedded within the material of the pickets.

Still a further object of this invention is to provide an apparatus for manufacturing a fence or other elongated, formed article from an extruded sheet of thermoplastic material, when the extrusion apparatus itself forms part of the apparatus of manufacture of the formed article.

DRIEF DESCRIPTION OF THE DRAWINGS

These and other features and objects of the invention are more clearly discussed hereafter, in association with the accompanying drawing, in which:

FIG. 1 is a perspective view of a first embodiment of a fence according to this invention;

FIG. 2 is a cross-section plan view taken in the direction of arrows 2—2 in FIG. 3;

FIG. 3 is a cross-section elevation view taken in the direction of arrows 3—3 in FIG. 2;

FIG. 4 is a perspective view to a larger scale of the embodiment of FIG. 1 as indicated by the circle and arrow A;

FIG. 5 is a perspective view of a second embodiment of a fence according to this invention;

FIG. 6 is a cross-section plan view taken in the direction of arrows 6—6 of FIG. 7;

FIG. 7 is a cross-section elevation view taken in the direction of arrows 7—7 of FIG. 6;

FIG. 8 is a perspective view to a larger scale of the embodiment of FIG. 5 as indicated by the circle and arrow B;

DESCRIPTION OF THE PREFERRED EMBODIMENTS

Figure 9:
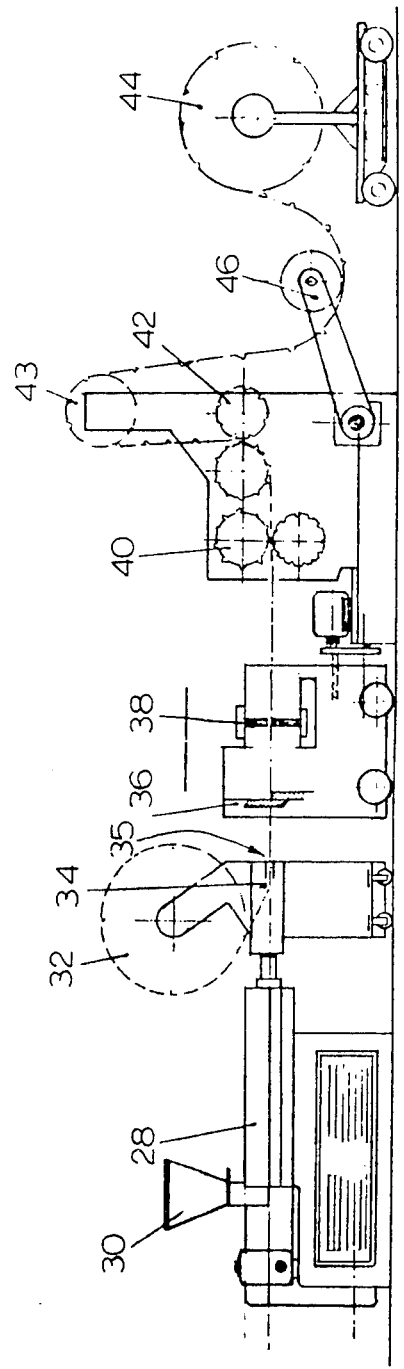
FIG. 9 is a schematic representation of an apparatus for manufacturing and forming the first embodiment of fence as illustrated in FIGS. 1 to 4.

The fence 10 of FIG. 1 comprises a plurality of bar-like structural members or pickets 12, and a plurality of connecting links 14. Each of the pickets 12 is creased as at 16, where each crease 16 extends substantially along the axial length of each picket 12. The axial length of each picket 12 is, of course, the height of the fence 10 at each such picket.

The connecting links 14 may conveniently be formed of wire, as discussed in greater detail hereafter. It is noticed that the wire is embedded in the material forming the pickets 12, as indicted at 18. The cross-sectional shape of the wire may be round, flat, triangular or any other convenient shape, and that shape has no bearing on the present invention. Also, the crease 16 formed in each picket 12 may be such that the picket has a plan configuration such as the V particularly as illustrated in FIG. 2; or the pickets 12 may be formed with a crease so as to give the pickets a U plan configuration, or such other configuration as may be required. The method of forming the crease 16 in each of the pickets 12 is discussed hereafter.

Turning to the alternative embodiment of fence according to this invention as illustrated in FIGS. 5 to 8, it is noted that the fence comprises a further plurality of pickets 22 having a plurality of connecting links 24 formed between adjacent ones of the pickets 22. Once again, the pickets 22 have a crease formed therein as at 26; and they may also have a plan configuration in the form of a V, or a U, or such other plan configuration as desired. Further, the connecting links 24 may be formed so as to lie behind the trailing edge of the picket 22, or substantially in the same plane as the trailing edge of the pickets, depending on the precise design of the forming rollers as discussed hereafter.

Turning to FIG. 9, there is shown a schematic layout of a line of equipment or apparatus on which a fence or similar article such as that illustrated in FIGS. 1 to 4 may be manufactured. The apparatus may include an extruder 28 - which may be a conventional sheet extruded for thermoplastic material - having a hopper 30. The apparatus also includes a wire unreeling device 32 which feeds wire through an extrusion die 34 together with the extruded plastic sheet, so that on exit from the die 34 as at 35, the wire from the wire reeling station 32 is completely encased within the extruded thermoplastic sheet. Cutters are arranged at 36, and are followed by pulling jaws at 38, as discussed hereafter. Form rollers are indicated at 40, and a chilling roller at 42 and 43. A reeling or rewind station 44 is provided, having a dancer roller 46.

The operation of the apparatus of FIG. 9 is such as to provide the method of this invention by which an elongated article such as a fence having a plurality of bar-like pickets with connecting links there between – of the sort of embodiment as illustrated in FIGS. 1 to 4 - may be achieved. As noted, sheet thermoplastic material is extruded from extruder 28 through the die 34. A plurality of wires is unwound from station 32 so that the wires are spaced apart in the same manner as the connecting links 14 as illustrated in FIGS. 1 and 3; and the wires are completely embedded in the extruded thermoplastic sheet as it leaves exit 35 of the die 34. Of course, the linear speed of the wire which is unreeled from station 32 and the thermoplastic sheet which is extruded from extruder 28 is identical.

The extruded thermoplastic sheet is then fed to a lancing or cutter station 36, where the thermoplastic material is sheared, but not the wires. The form of the cutting means at the lancing station 36 is such as to ensure that the wires embedded in the thermoplastic extruded sheet will not be cut. When the thermoplastic material has been sheared, the pulling jaws 38 may clamp the wires, and advance in a direction to the right as illustrated at a faster speed than the exit speed from exit 35 of extruder die 34, so as to pull the portion of lanced or cut thermoplastic material to the right of the lancing station 36 ahead of that lancing station. This permits a spacing apart of a slat or bar-like member from the one following it and the one immediately preceding it, and provides for the spacing between pickets 12 as shown in FIGS. 1 and 4.

The timing of the operation of the lancing station 36 and the shears thereat, and the pulling jaws 38 is such as to provide the requisite spacing between the bar-like members which so far have been formed to the requisite spacing along the wires embedded therein. Aslo, it should be noted that it may be necessary to heat the wires as they enter the die 34 to provide for the pulling of the wires without tearing the thermoplastic material. Further, the wires may have some coating of thermoplastic material on them as they are released from the pulling jaws 38.

The extruded thermoplastic sheet material with wires embedded therein, which by now is such that it comprises a plurality of bar-like members spaced lengthwise along the wires in the direction of the extrusion process, is then fed to form rollers indicated generally at 40. The form rollers are, in most cases, heated - depending upon the seting properties of the thermoplastic material - and are such as to form the crease 16 in each of the bar-like members as it reaches the form rollers 40, in the requisite as determined by the shape of the rollers. The product then has the appearance very much as that indicated in FIG. 1. The formed product is then fed past chilling rollers 42 and 43 to accommodate the set and rigidification of the thermoplastic material; and thence past a dancer roller 46 to a rewind or take-off station 44.

Figure 10:
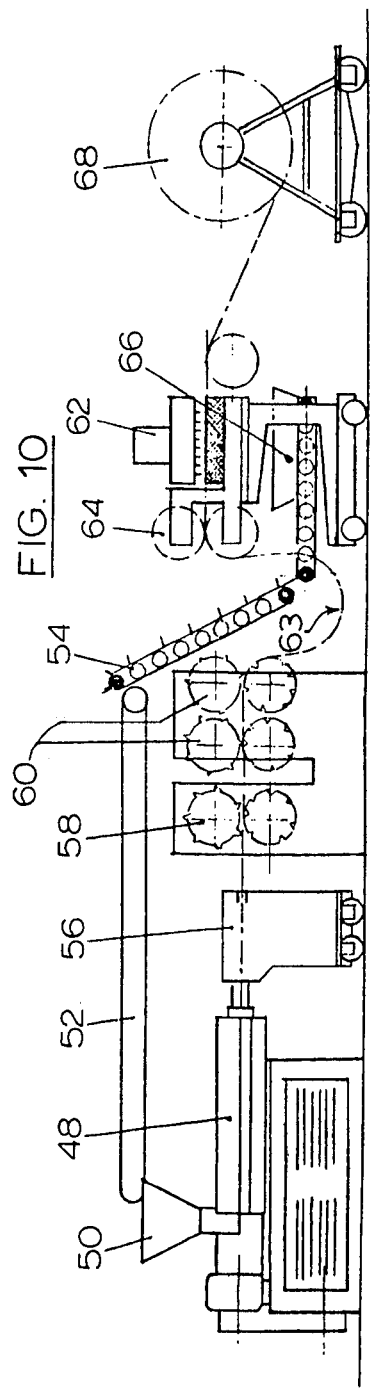
FIG. 10 is a schematic representation of an apparatus for manufacturing and forming the second embodiment of fence as illustrated in FIGS. 5 to 8.

Turning now to FIG. 10, there is shown a schematic layout of a somewhat different line of apparatus for forming a fence such as that illustrated in FIGS. 5 to 8.

In this case, an extruder 48 is shown having hopper 50 and conveyors 52 and 54 as disscussed hereafter. At the exit end of the extruder 48 there is a die head station 56 followed by heated form rollers 58 and chilling rollers 60. A further blanking die 62 is provided, having a feed roller 64, and with a granulator 66 located beneath the die 62. Finally, a rewind or take-off station 68 is shown at the extreme right-hand end of the schematic layout of FIG. 10, as illustrated.

In the operation of apparatus such as that schematically represented in FIG. 10, a thermoplastic extruded sheet is taken from extruder 48 through a die head station 56 in the usual or conventional sheet extrusion process. The extruded thermoplastic sheet then enters form rollers 58, which may be heated, so as to form or shape the thermoplastic sheet with creases such as those indicated at 26 in FIGS. 6 and 8, across the width of the extruded thermoplastic sheet. The formed sheet is then fed past the chilling rollers 60.

After the formed sheet exits from the chilling rollers 60, it may fall into a loop as indicated at 63, from which it passes into feed rollers 64 to a blanking die 62. The blanking die 62 cuts the openings in the formed thermoplastic sheet at places other than where the creases may be formed and where the connecting links 24 are to be formed. In other words, the blanking die 62 cuts the openings which are between adjacent ones of the pickets 24 as illustrated in FIG. 5 and lengthwise along the axial length thereof between the connecting links 24. The cut and formed thermoplastic sheet then has an appearance similar to that as illustrated in FIG. 5, and is taken to a rewind and take-off station 68. The scrap from the blanking die 62 goes to a granulator 66, and thence by conveyors 54 and 52 to the hopper 50 associated with the extruder 48.

It should be noted that the blanking die 62 may be interposed between the extruder die head station 56 and the forming rollers 58, so that the blanks are cut before the creases are formed in the bar-like members which would then be found in the extruded thermoplastic sheet material.

It can readily be seen that the width of the extruded thermoplastic sheet material need not be constant, provided that it is desired that the height of the fence or like article to be formed therefrom is not constant. For example, the width of the thermoplastic material may be cut at another die cutting station or a progressive-die station so that the upper edge of the pickets 12 or 22 may form a V or other shape, and the upper or lower edges of the fence may be scalloped for the sake of appearance. Thus, the width of the extruded thermoplastic sheet material at any point is determinate of the height of the fence or like article to be formed therefrom at the picket which will ultimately be formed at any place along the length of the extruded thermoplastic sheet and across its width at that point.

As noted, it is particularly intended that the material from which a fence according to this invention may be made would be a thermoplastic material such as high density polyethylene or other suitable material. Further, it will be noted that when such a material is used and is formed into a snow fence having the usual dimensions, a 100 foot length of the fence may weight in the order of 70 pounds or so as compared with 170 pounds of a 100 foot length of conventional wire and wooden slat snow fence of the same height.

It will also be noted that the method of manufacture of the elongated article such as a snow fence from extruded thermoplastic sheet material is such that the sheet material may be cut before the pickets of the fence are formed, or the pickets of the fence may be formed at least so far as to have the crease therein before the material is cut. Further, if wire is embedded in the picket material - and the wire may also be coated with thermoplastic material - there is no scrap from the manufacturing process because the wire is intermittently pulled ahead of the thermoplastic sheet material in which it is embedded by separation of the pulling jaws 38 from the lancing station 36 in the direction of feed of the extruder and away therefrom.

There has been described a fence or like article which is made from cut and formed, extruded thermoplastic sheet material. There has also been described a method of manufacture of the fence or other like elongated articles; and two embodiments of a plastic fence particularly intended for use as a snow fence, boundary fence or ornamental fence have been shown, together with apparatus which follows the method of manufacture of such articles as taught by this invention but which provides either of the preferred embodiments. Other changes, alterations and amendments to the product according to this invention or the method of manufacture of the same, apart from those particularly discussed above, may be made without departing from the spirit and scope of the appended claims.

What I claim is:

1. A method of manufacture of a fence having a plurality of pickets, each of said pickets comprising a creased bar-like component extending substantially for the full height of the fence at each said picket; said picket being substantially parallel one to another, and spaced along the length of said fence; there being a plurality of connecting links secured to each of said pickets and arranged substantially lengthwise of said fence between adjacent ones of said pickets; wherein said pickets are formed of a thermoplastic material; said method comprising the steps:

a. extruding a sheet of thermoplastic material whose width is at least equal to the height of the fence to be formed at any given picket therein; where said sheet is extruded having a plurality of wires embedded lengthwise therein, the number of wires being equal to the number of links between said pickets;

b. cutting said extruded sheet across its width, but not said plurality of wires, so as to form a picket portion each time a cut is made;

c. clamping said wires on the side of said cut picket portion closest to the place where it is extruded, and pulling each picket portion in turn away from the place where it is cut, so as to move said picket portion longitudinally along said plurality of wires embedded in said extruded thermoplastic sheet and thereby to form said pickets and said connecting links therebetween;

d. creasing said pickets and the wires embedded therein along the axial length of said pickets; and allowing said pickets to cool so as to rigidify the same.

2. The method of claim 1 where said extrusion of said thermoplastic sheet material is a continuous process.

3. The method of claim 2 further comprising the step of:

reeling said fence after it is formed and cooled.

4. The method of claim 2 further comprising the step of:

heating said plurality of wires before they are embedded in said extruded thermoplastic sheet material.

* * * * *